UNITED STATES PATENT OFFICE.

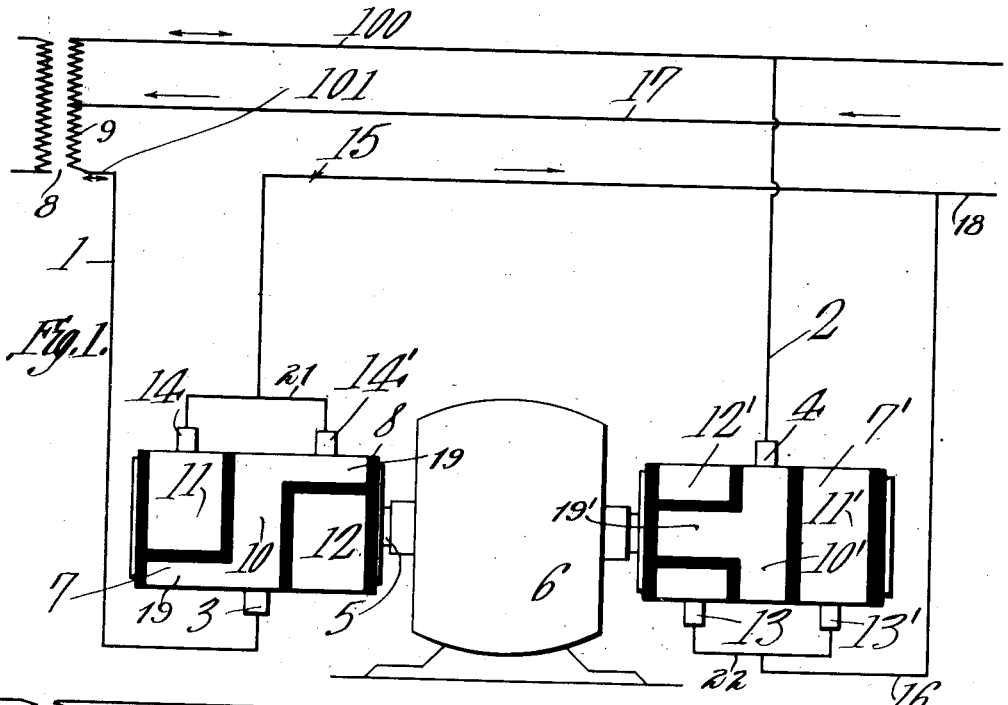

WILLIAM E. BUTLER, OF DAVID CITY, NEBRASKA.

ROTARY ELECTRICAL CONVERTER OR RECTIFIER.

1,197,262.   Specification of Letters Patent.   Patented Sept. 5, 1916.

Application filed June 5, 1911. Serial No. 631,232.

*To all whom it may concern:*

Be it known that I, WILLIAM E. BUTLER, a citizen of the United States, residing at David City, in the county of Butler and State of Nebraska, have invented a new and useful Rotary Electrical Converter or Rectifier, of which the following is a specification.

The present invention appertains to electrical converters or rectifiers, and aims to provide a novel and improved rotary converter or rectifier for changing an alternating current into a direct current, the machine embodying commutators of novel and improved construction which control the circuits, whereby an alternating current operating the synchronous motor of the converter is made to impress a direct current upon the line wires or conductors.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a diagrammatical view of the converter illustrating the commutators and circuits. Fig. 2 is a similar view illustrating certain modifications.

Referring to Fig. 1, there is depicted a synchronous motor 6 having the armature shaft 5 which carries a pair of commutators 7—7' preferably disposed at the opposite sides of the motor 6. The commutator 7 embodies a commutator ring 10 disposed between a pair of commutator segments 11 and 12, said segments 11 and 12 being disposed in opposite positions and having their end portions in overlapped yet spaced relation, it being noted that the ring 10 is disposed between the segments. The ring 10 has longitudinal extensions 19 projecting in opposite directions between the ends of the respective segments 11—12, and the ring 10 and its extensions are insulated suitably from the segments.

The commutator 7' is of similar construction, and embodies a central commutator ring 10' disposed between a pair of commutator segments 11' and 12' arranged in opposite positions, the ring 10' having longitudinal extensions 19' between the ends of the segments. By comparing the two commutators, the detail construction of each will be readily understood since the commutators are duplicates of one another.

Coöperable with the commutator rings 10 and 10' are the respective brushes 3 and 4, and the respective brushes 14 and 14' are coöperable with the segments 11 and 12, while brushes 13 and 13' are coöperable with the respective segments 12' and 11'. The brushes 14—14' are disposed diametrically opposite the brush 3 and are arranged in longitudinal alinement relative to the commutator 7, and the brushes 13—13' are disposed diametrically opposite the brush 4 and are arranged in longitudinal alinement relative to the commutator 7'. The brushes 14 and 14' are alternately engageable with the extensions 19 of the ring 10, and the brushes 13 and 13' are alternately engageable with the extensions 19' of the ring 10', while the brushes 3 and 4 continually engage the respective rings 10 and 10'. While one of the brushes 14—14' engages the respective extension 19, the other of said brushes continues to engage its segment, and while one of the brushes 13—13' engages one of the extensions 19', the other of said brushes continues to engage its segment. One of the brushes of each of said pairs is thus always engaging one of the respective segments.

The brushes 14—14' are connected or bridged by a conductor 21, and the brushes 13—13' are connected or bridged by a conductor 22. The conductors 21 and 22 are connected by the respective wires or conductors 15 and 16 with a line wire 18 along which the current flows from the commutators.

The return line wire 17 has its terminal connected to the secondary winding 9 of a transformer 8 between the ends of said secondary winding, and to the terminals of said secondary winding are connected the respective wires or conductors 100 and 101. The conductor 100 is connected by a wire or conductor 2 with the brush 4, and the conductor 101 is connected by the wire or conductor 1 with the brush 3.

In operation, supposing an alternating current is impressed upon the primary of the transformer, with the synchronous motor 6 in operation, an alternating current is thereby impressed upon the secondary winding 9. The operation of the motor 6 is timed according to the frequency of the alternating current, whereby the commutators are rotated properly. The terminals of the armature winding can be connected to the commutator rings 10 and 10', whereby the alternating current is impressed in the armature winding for operating the motor 6, it being noted that the rings 10 and 10' are connected by the respective conductors 1—101 and 2—100 with the opposite terminals of the secondary winding 9. Now, supposing the commutators to be arranged as illustrated in Fig. 1, with the current flowing momentarily downward in the secondary winding, the current will flow along the conductors 101 and 1 to the commutator ring 10, and will flow to the brush 14' which engages the respective extension 19, so that the current flows by way of the conductors 21 and 15 to the conductor 18 to the point of consumption, the current being returned by the conductor 17 to the intermediate portion of the winding 9, it being noted that that portion of the current which flows from the ring 10 through the armature winding to the ring 10' can pass by way of the conductors 2 and 100 to the upper terminal of the winding 9. Now by the time that the opposite impulse is impressed on the winding 9, the commutators are rotated one-quarter of a revolution, so that the brush 14' now engages the segment 12, the brushes 14 and 14' being disposed between the extensions 19, while the brush 13 engages the respective extension 19'. The current will now flow in the opposite direction upwardly within the winding 9, thus sending the current in the opposite direction between the commutator rings, current flowing from the ring 10' to the ring 10. At the same time, current flows from the ring 10' to the brush 13 and thence along the conductors 22 and 16 to the conductor 18 in the same direction as before, the current returning by way of the conductor 17 to the winding 9 and passing upwardly along the upper half of said winding, while the current from the ring 10 passes by way of the conductors 1 and 101 to the lower end of said winding to pass upwardly. When the commutators are again rotated one-quarter of a turn, it being understood that the rotation is continuous, the brush 14 now engages its extension 19, and the proper connections are again made by the commutators so that when the next impulse follows, the current will flow properly to the conductor 18 and return by way of the conductor 17. During the final one-quarter revolution, the brush 13' engages the other extension 19' of the ring 10'.

It will therefore be obvious that the motor 6 being operated in synchronism will properly rotate the commutators so that a direct current flows in the line conductors 17 and 18 at all times, while an alternating current is impressed upon the secondary winding.

In the arrangement illustrated in Fig. 2 there are several changes, but the general operation is the same. The synchronous motor $6^a$ has an armature shaft $5^a$ carrying the opposite commutators $7^a$ and $7^b$. The commutator $7^a$ has a pair of commutator rings $10^a$ and $11^a$ provided with the respective segments $20^a$ and $20^b$ projecting between one another, said rings and segments being insulated, as will be apparent. The commutator $7^b$ has rings $10^b$ and $11^b$ insulated from one another and provided with the segments $19^a$ and $19^b$, respectively, projecting between one another. Each of the rings has two opposite segments between which the segments of the companion ring project. Brushes $3^a$ and $4^a$ continually engage the respective rings $10^b$ and $10^a$, and brushes $13^a$ and $14^a$ are alternately engageable with the respective segments $19^a$—$19^b$ and $20^a$—$20^b$.

The brush $3^a$ is connected by a conductor $1^a$ with a conductor $101^a$ connected to one end of the secondary winding $9^a$ of the transformer $8^a$, and the brush $4^a$ is connected by a conductor $2^a$ with a conductor $100^a$ connected to the other terminal of the winding $9^a$. The brush $14^a$ is connected by a conductor $15^a$ with the line conductor $18^a$, and the brush $13^a$ is connected by a conductor $16^a$ with the line conductor $18^a$, the return wire or conductor $17^a$ of the line being connected to the winding $9^a$ between the terminals thereof. The armature winding can be terminally connected to the rings $10^a$ and $10^b$ whereby an alternating current will be impressed upon the armature winding for operating the motor, the same as with the motor 6 above described.

When one of the brushes $13^a$—$14^a$ engages one of the segments of the ring $10^a$ or $10^b$, the other of said brushes is disengaged from the other of said rings, so that the rotation of the commutators will reverse the connections so that the current always flows to the conductor $18^a$ and back by way of the conductor $17^a$.

The field windings of the motor $6^a$ can be connected to the conductors $17^a$ and $18^a$ to receive a direct current, or one terminal of the field windings may be connected to both of the rings $11^a$ and $11^b$, while the other terminal is connected to both of the rings $10^a$ and $10^b$. Since the rings $11^a$ and $11^b$ always receive a positive impulse or wave, it is evident that a direct current will flow through the field windings.

The same thing can be accomplished with the arrangement illustrated in Fig. 1, since the segments 11, 12, 11' and 12' can all be connected to one terminal of the field windings, while the rings 10 and 10' are connected to the other terminal of said windings, which will result in a direct current being impressed upon the field windings at all times, the same as if the field windings are connected to the conductors 17 and 18.

What is claimed is:

1. An electrical converter including in combination with a transformer having a secondary winding, a synchronous motor, a commutator device operated by said motor and embodying a pair of commutator rings having segments projecting therefrom, brushes continually engageable with said rings and connected to the opposite terminals of said secondary winding, a line conductor connected to said winding between the terminals thereof, brushes alternately engageable with said segments, and a second line conductor connected to the last mentioned brushes.

2. An electrical converter embodying in combination with a transformer having a secondary winding, a synchronous motor, a pair of commutators operated by said motor and each embodying a pair of oppositely disposed segments and ring connections between said segments, members extending between the ends of the segments, brushes continually engageable with the ring connections of the commutators and connected to the opposite terminals of said secondary winding, a line conductor connected to said secondary winding between the terminals thereof, brushes for the commutators to engage the respective segments and to alternately engage the members extending between the segments, and a second line conductor connected to the last mentioned brushes.

In testimony that I claim the foregoing as my own, I have hereto affixed my signature in the presence of two witnesses.

WILLIAM E. BUTLER.

Witnesses:
J. K. MASHEK,
KATHERINE MEUCH.